United States Patent
Goto

(10) Patent No.: US 8,150,310 B2
(45) Date of Patent: Apr. 3, 2012

(54) SETTING METHOD OF COMMUNICATION PARAMETERS, COMMUNICATING APPARATUS, CONTROL METHOD OF COMMUNICATING APPARATUS, AND PROGRAM

(75) Inventor: Fumihide Goto, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 413 days.

(21) Appl. No.: 12/439,823

(22) PCT Filed: Oct. 12, 2007

(86) PCT No.: PCT/JP2007/070387
§ 371 (c)(1),
(2), (4) Date: Mar. 3, 2009

(87) PCT Pub. No.: WO2008/047884
PCT Pub. Date: Apr. 24, 2008

(65) Prior Publication Data
US 2010/0203825 A1 Aug. 12, 2010

(30) Foreign Application Priority Data
Oct. 20, 2006 (JP) .................. 2006-286470

(51) Int. Cl.
*H04B 3/36* (2006.01)
(52) U.S. Cl. .......................... 455/7; 370/315
(58) Field of Classification Search .................. None
See application file for complete search history.

(56) References Cited

U.S. PATENT DOCUMENTS

| | | | |
|---|---|---|---|
| 7,349,664 B2 * | 3/2008 | Ochi et al. | 455/11.1 |
| 7,706,788 B2 * | 4/2010 | Ascolese et al. | 455/432.1 |
| 7,720,038 B2 * | 5/2010 | Bennett | 370/338 |
| 7,756,468 B2 * | 7/2010 | Kojima | 455/7 |
| 7,774,495 B2 * | 8/2010 | Pabla et al. | 709/238 |
| 2004/0215707 A1 | 10/2004 | Fujita et al. | 709/201 |
| 2006/0153135 A1 | 7/2006 | Ascolese et al. | 370/331 |
| 2006/0203833 A1 | 9/2006 | Hara et al. | 370/401 |

FOREIGN PATENT DOCUMENTS

| JP | 2002-232659 | 8/2002 |
|---|---|---|
| JP | 2003-338821 | 11/2003 |

OTHER PUBLICATIONS

International Search Report and Written Opinion dated Jan. 30, 2008 in International Application No. PCT/JP2007/070387.
European Office Action dated Dec. 30, 2011 in corresponding European Application No. 07830121.5.

* cited by examiner

*Primary Examiner* — Cassandra Cox
(74) *Attorney, Agent, or Firm* — Fitzpatrick, Cella, Harper & Scinto

(57) ABSTRACT

It is difficult that a providing apparatus which provides communication parameters is decided by a receiving apparatus which receives the communication parameters from the providing apparatus. Based on a discrimination condition, a first communicating apparatus selects whether the communicating apparatus operates as a relay apparatus in a communication parameter setting protocol between the providing apparatus and the receiving apparatus or operates as a proxy apparatus which executes the communication parameter setting protocol as a proxy of the providing apparatus between the providing apparatus and the receiving apparatus.

17 Claims, 8 Drawing Sheets

SETTING METHOD OF COMMUNICATION PARAMETERS, COMMUNICATING APPARATUS, CONTROL METHOD OF COMMUNICATING APPARATUS, AND PROGRAM

TECHNICAL FIELD

The invention relates to a communication parameter setting method when setting a communication parameter into a communicating apparatus, the communicating apparatus, a control method of the communicating apparatus, and a program.

BACKGROUND ART

In radio communication represented by a wireless LAN which conforms with the IEEE802.11 Standard Series, a number of setting items which have to be set prior to using exist. For example, as setting items, there are radio parameters such as SSID as a network identifier, cryptographic algorithms, encryption key, authentication algorithms, authentication key, and the like which are necessary to make the radio communication. It is very troublesome for the user to set them by the hand.

Therefore, automatic setting methods of easily setting the radio parameters into a radio apparatus have been devised by various makers. According to such automatic setting methods, the radio parameters are provided from one apparatus to another apparatus and are automatically set by using a procedure which has been preset between the apparatuses to be connected and messages.

With respect to the automatic setting method of the radio parameters, there are many cases where each maker uses a unique method. Therefore, between the apparatuses which do not cope with the common radio parameter automatic setting method, since the procedures for setting the radio parameters differ or the messages which can be decoded differ, the radio parameters cannot be set by using the automatic setting method. On the other hand, between the apparatuses which cope with the common radio parameter automatic setting method, the radio parameters can be easily set by using the automatic setting method.

An example of the automatic setting of the radio parameters has been disclosed in Japanese Patent Application Laid-Open No. 2003-338821.

DISCLOSURE OF THE INVENTION

In the automatic setting method of the radio parameters, roles of both of a providing apparatus for providing the radio parameters to another radio apparatus and a receiving apparatus for receiving the radio parameters provided from the providing apparatus and setting into its own apparatus are necessary.

Therefore, when the radio apparatus desires to receive the radio parameters by the automatic setting, the radio apparatus has to search for the providing apparatus of the radio parameters.

However, the providing apparatus of the radio parameters cannot be easily searched for because the following problems exist.

First, there is such a problem that the providing apparatus does not always respond to a signal for searching for the providing apparatus. For example, in an Ad-Hoc network of the IEEE802.11 Standard, a station which returns a response to a probe request as a search request signal is a station which has finally transmitted a beacon. Therefore, there is a case where even if the probe request was transmitted in order to search for the providing apparatus, an apparatus other than the providing apparatus responds to the probe request.

Second, there is such a problem that there is a case where the apparatus which desires to receive the radio parameters cannot directly communicate with the providing apparatus.

It is an object of the invention to enable communication parameter automatic setting to be executed under an environment where it is difficult to decide a providing apparatus of communication parameters.

Other objects of the invention will be more apparent from the following description of the specification and the drawings.

According to the invention, based on a discrimination condition, a first communicating apparatus selects whether the communicating apparatus operates as a relay apparatus of a communication parameter setting protocol between a providing apparatus which provides communication parameters and a receiving apparatus which receives the communication parameters from the providing apparatus or operates as a proxy apparatus which executes the communication parameter setting protocol as a proxy of the providing apparatus.

Further features of the present invention will become apparent from the following description of exemplary embodiments with reference to the attached drawings.

BEST MODE FOR CARRYING OUT THE INVENTION

A radio communication terminal according to the invention will be described in detail hereinbelow with reference to the drawings.

Although an example in which the wireless LAN system which conforms with the IEEE802.11 Series is used will be described hereinbelow, a communicating form is not always limited to the wireless LAN which conforms with the IEEE802.11.

A hardware construction in an example suitable for an embodiment will be described.

Figure 1:
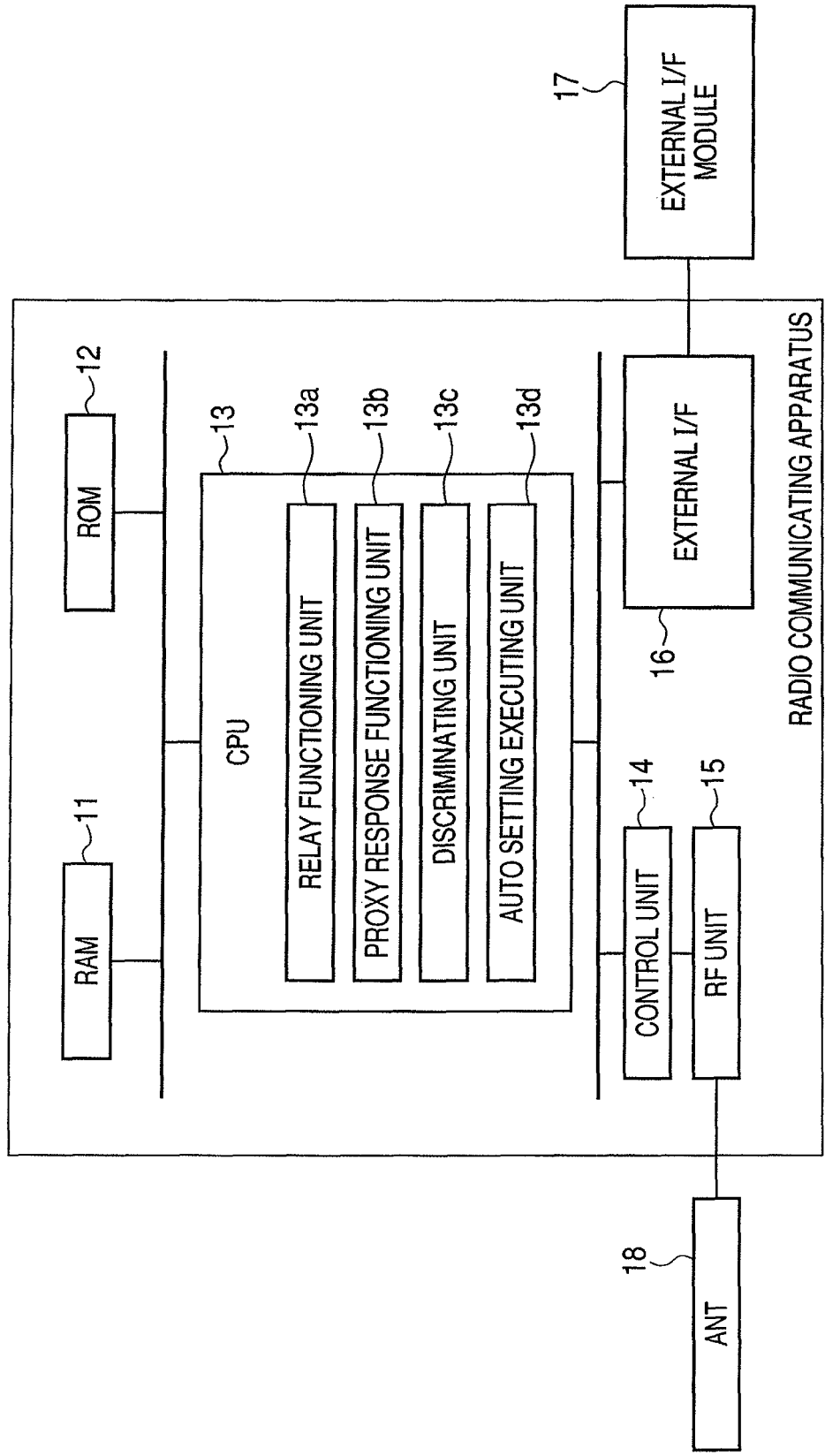
FIG. 1 is a block diagram illustrating a construction of a communication terminal.

FIG. 1 is a block diagram illustrating an example of a construction of a communication terminal having an automatic setting application of radio parameters according to the embodiment.

The automatic setting application of the radio parameters according to the embodiment provides the radio parameters such as SSID as a network identifier, cryptographic algorithms, encryption key, authentication algorithms, authentication key, and the like which are necessary to make the radio communication from a first communication terminal to a second communication terminal. SSID is an abbreviation of "Service Set Identifier". The second communication terminal sets the provided radio parameters. In this instance, the radio parameters are provided by a procedure which has been preset by using a packet which can be communicated irrespective of the radio parameters of both of the communication terminals and messages. It is also possible to construct in such a manner that when the radio parameters are provided, both of the communication terminals are shifted to a setting mode and the parameters are switched to the preset radio parameters for setting, thereby enabling the communication between the communication terminals to be made and enabling the radio parameters to be provided by the preset procedure and the messages.

Programs for executing various processes, which will be described hereinafter, have been stored in a ROM 12 illustrated in FIG. 1. Temporary variables, data, and cache are stored in a RAM 11. A CPU 13 executes the programs stored in the ROM 12 and executes the various processes, which will be described hereinafter. The CPU 13 has: a relay functioning unit 13a for executing a relaying function, which will be described hereinafter; a proxy response functioning unit 13b for executing a proxy responding function, which will be described hereinafter; and a discriminating unit 13c for executing a discrimination shown in FIG. 8. The CPU 13 also has: an automatic setting executing unit 13d for executing the automatic setting application of the radio parameters. The programs which are executed by the relay functioning unit 13a, proxy response functioning unit 13b, discriminating unit 13c, and automatic setting executing unit 13d have been stored in the ROM 12. A control unit 14 controls a radio function. An RF unit 15 makes the wireless LAN communication which conforms with the IEEE802.11 through an antenna unit 18. An external interface unit 16 is a wired interface for connecting the communication terminal and external apparatuses. An external interface module 17 is a module such as a connector or the like for connecting the external apparatuses. Information processing apparatuses such as personal computer, digital camera, printer, scanner, and the like serving as external apparatuses are connected through the external interface unit 16 and the external interface module 17. The hardware construction illustrated in FIG. 1 is an example and another construction can be also used.

Figure 2:
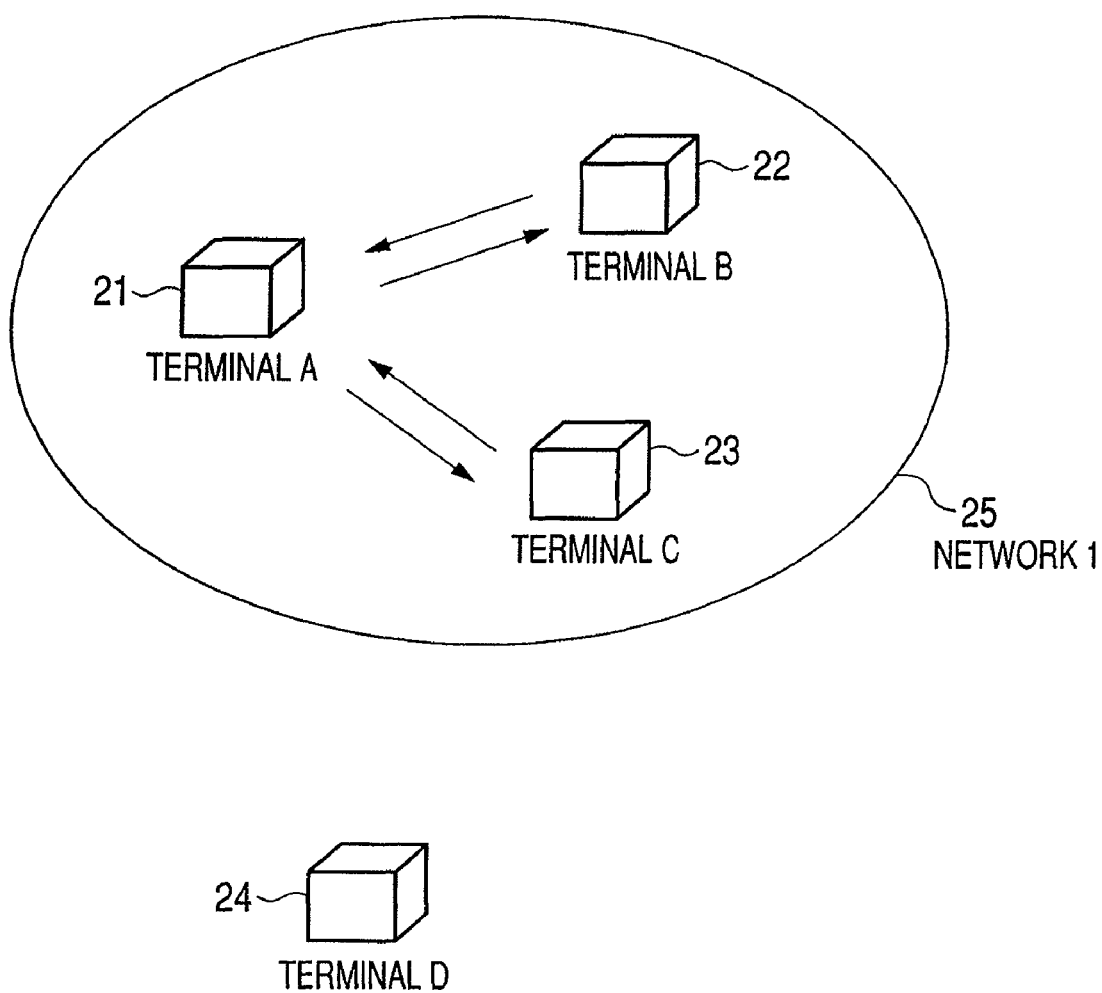
FIG. 2 is a diagram of a communication system constructed by a plurality of communication terminals.

A communication system constructed by a plurality of, for example, four communication terminals as illustrated in FIG. 2 will now be described as a radio communication system in the embodiment.

Terminals A, B, and C form a same Ad-Hoc network 1. It is now assumed that the terminals B and C as receiving apparatuses of the radio parameters are notified of the radio parameters from the terminal A as a providing apparatus of the radio parameters and the same settings have been made to the terminals A, B, and C.

Figure 3:
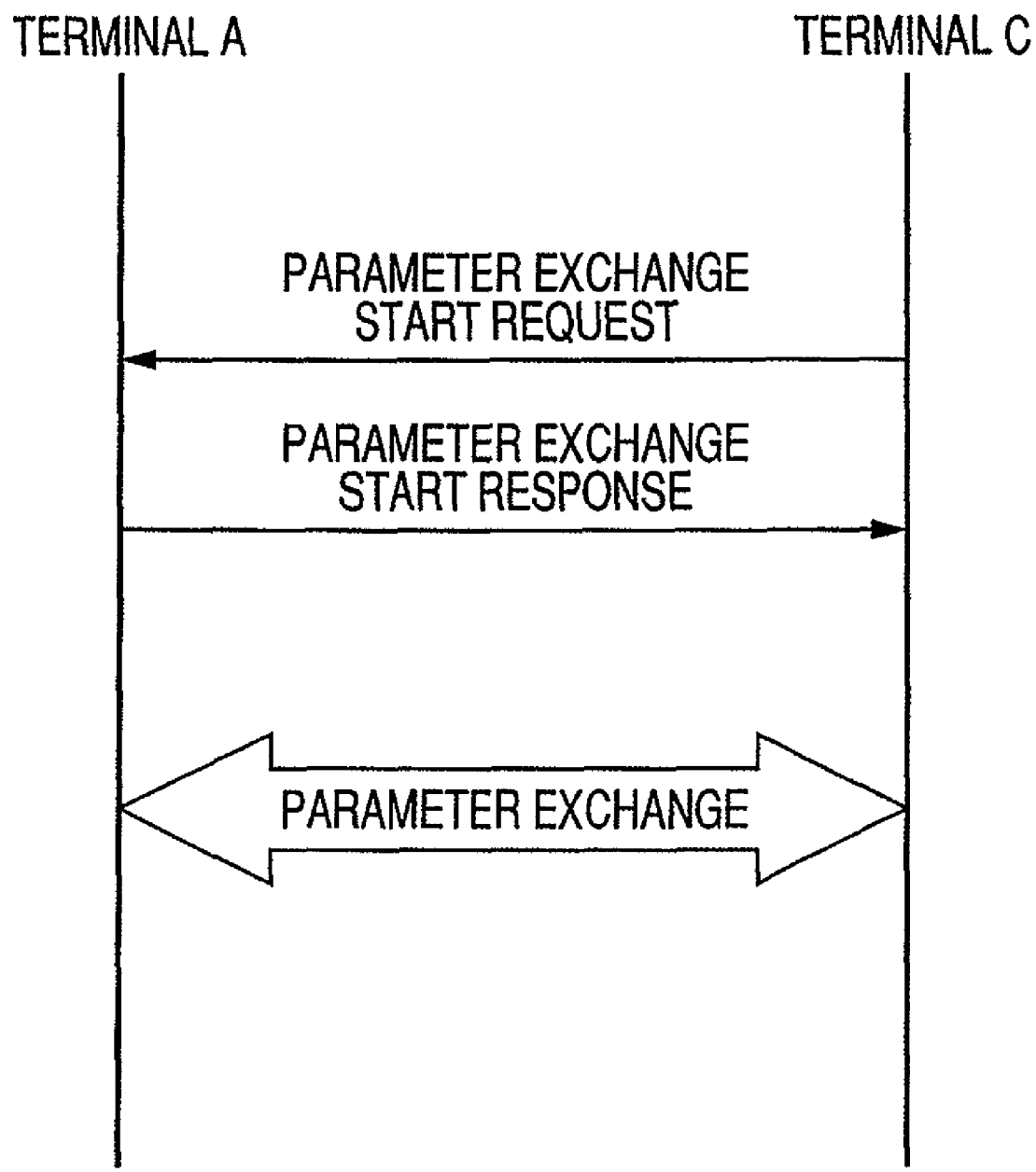
FIG. 3 is a schematic diagram of a sequence for automatically setting radio parameters between terminals A and C.

FIG. 3 is a schematic diagram of a sequence for automatically setting the radio parameters between the terminals A and C. This operation is executed by a method whereby the automatic setting executing unit 13d in the CPU 13 of each of the terminals A and C executes the programs stored in the ROM 12.

In the radio parameter automatic setting sequence in the embodiment, transmits an exchange start request of the radio parameters is transmitted from the terminal C as a receiving apparatus of the radio parameters toward the terminal A as a providing apparatus of the radio parameters. The terminal A as a providing apparatus which received the exchange start request returns an exchange start response of the radio parameters. After that, the terminals A and C start a predetermined exchanging protocol of the radio parameters and the radio parameters are transmitted from the terminal A to the terminal C.

Between the terminals A and B in FIG. 2, similarly, the radio parameter automatic setting sequence is also executed. The terminal B as a receiving apparatus is notified of the radio parameters from the terminal A as a providing apparatus. The radio parameters are set.

A case where a terminal D newly participates in the network 1 will now be considered.

In the case of the wireless LAN according to the IEEE802.11 Standard, the terminal D transmits a probe request to the network 1 in order to newly participate in the network. In the Ad-Hoc network which conforms with the IEEE802.11 Standard, it is assumed that the station which returns the response to the probe request is the station which has finally transmitted the beacon. Therefore, from a nature of the Ad-Hoc network, the terminal which returns the response to the probe request transmitted by the terminal D is not always the terminal A as a providing apparatus of the radio parameters.

In the case where the terminal A as an inherent providing apparatus of the radio parameters returned the probe response to the probe request transmitted from the terminal D, the radio parameter automatic setting sequence in which the terminal C in FIG. 3 is regarded as a terminal D is executed.

However, there is also a case where the terminal B or C which is not the providing apparatus of the radio parameters returns the probe response to the probe request from the terminal D.

Thus, the case where the terminal C returned the probe response to the probe request from the terminal D will now be described.

The terminal C executes the operation for relaying a signal adapted to execute the radio parameter automatic setting sequence from the terminal D to the terminal A or the operation for executing the radio parameter automatic setting sequence with the terminal D in place of the terminal A because the terminal C have already received and set the radio parameters to be set from the terminal A. Those two operations are selectively executed according to a discrimination, which will be described hereinafter.

First, a case where the terminal C relays the radio parameter automatic setting sequence from the terminal D to the terminal A will be described.

Figure 4:
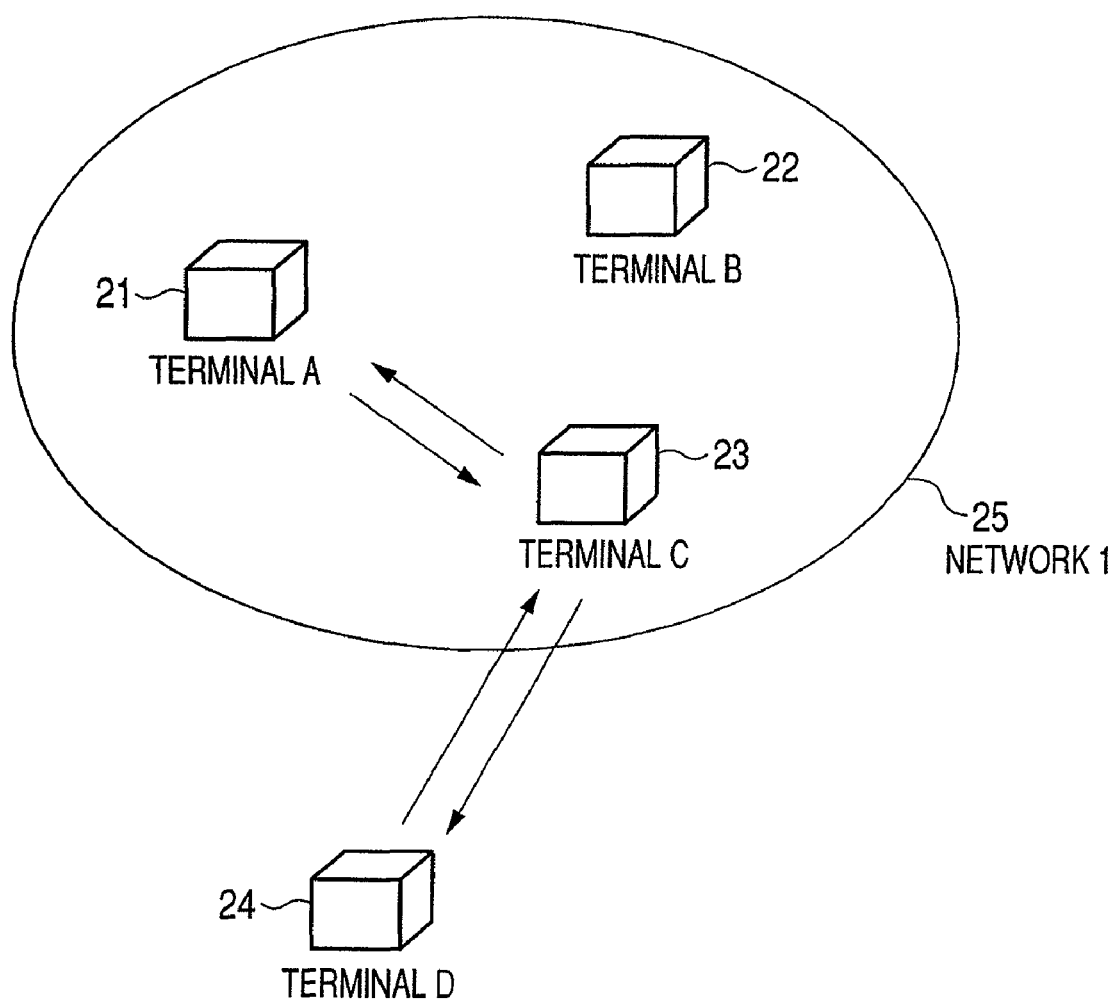
FIG. 4 is a schematic diagram in the case where the terminal C operates as a relay apparatus of the radio parameter automatic setting sequence.

FIG. 4 is a schematic diagram in the case where the terminal C operates as a relay apparatus of the radio parameter automatic setting sequence.

Figure 5:
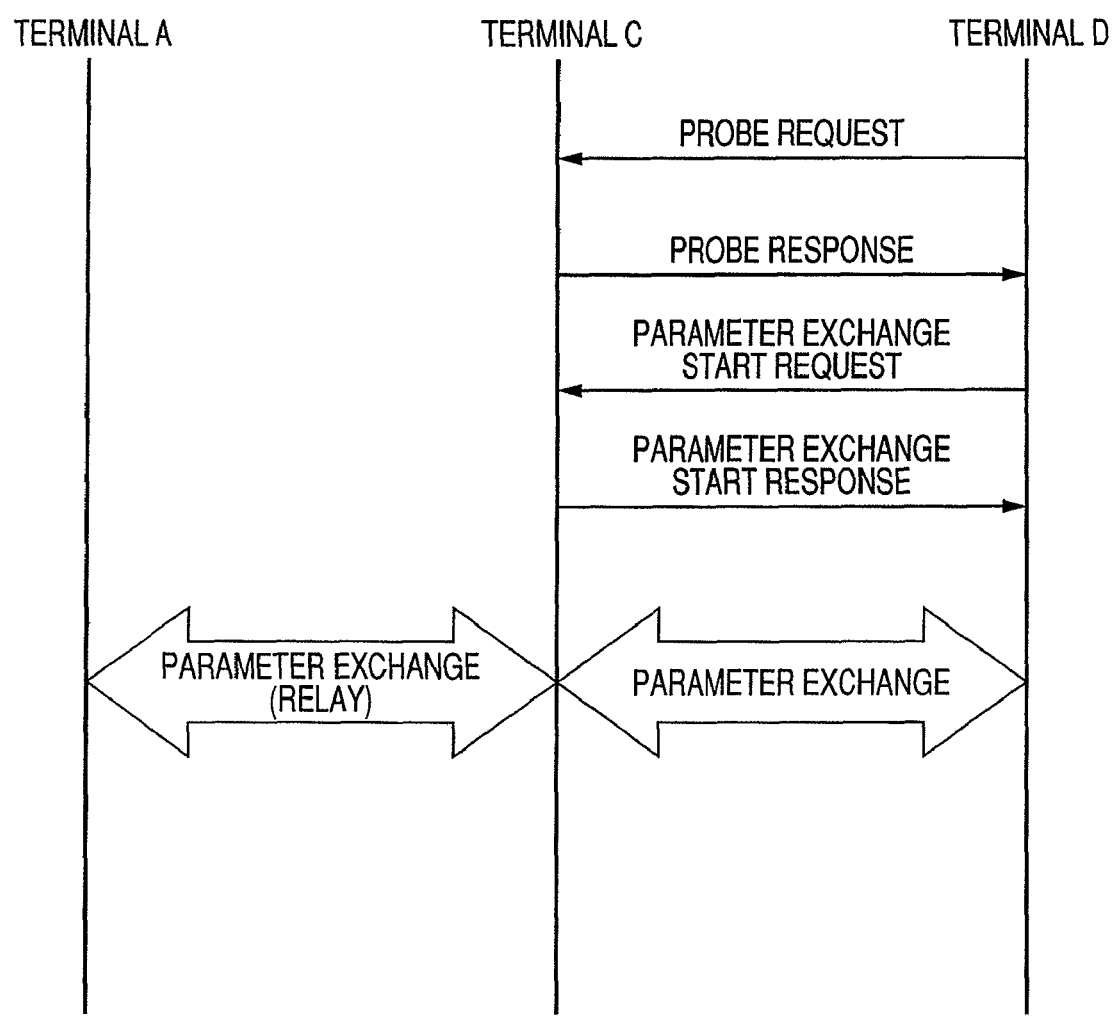
FIG. 5 is a schematic diagram of the radio parameter automatic setting sequence in the case where the terminal C operates as a relay apparatus of the radio parameter automatic setting sequence.

FIG. 5 is a schematic diagram of a signal sequence among the terminals in FIG. 4. The operations in FIGS. 4 and 5 are executed by a method whereby the relay functioning unit 13a in the CPU 13 of each of the terminals A, C, and D executes the programs stored in the ROM 12.

The terminal D transmits the probe request to the network 1 in order to participate in the network 1. It is now assumed that after the terminal C finally transmitted the beacon, the terminal D has transmitted the probe request. When the probe request is received, the terminal C returns the probe response to the terminal D. When the probe response is received, the terminal D transmits a radio parameter exchange start request to the terminal C. When the radio parameter exchange start request is received, the terminal C returns a radio parameter exchange start response to the terminal D.

When the radio parameter exchange start response is received, the terminal D makes the radio parameter automatic setting sequence operative. The terminal C does not operate as a radio parameter providing apparatus but relays the signal for the radio parameter automatic setting sequence from the terminal D to the terminal A each time. The signal for the radio parameter automatic setting sequence from the terminal A is relayed to the terminal D every time.

Subsequently, a case where the terminal C makes a response of the radio parameter automatic setting sequence from the terminal D in place of the terminal A will be described.

Figure 6:
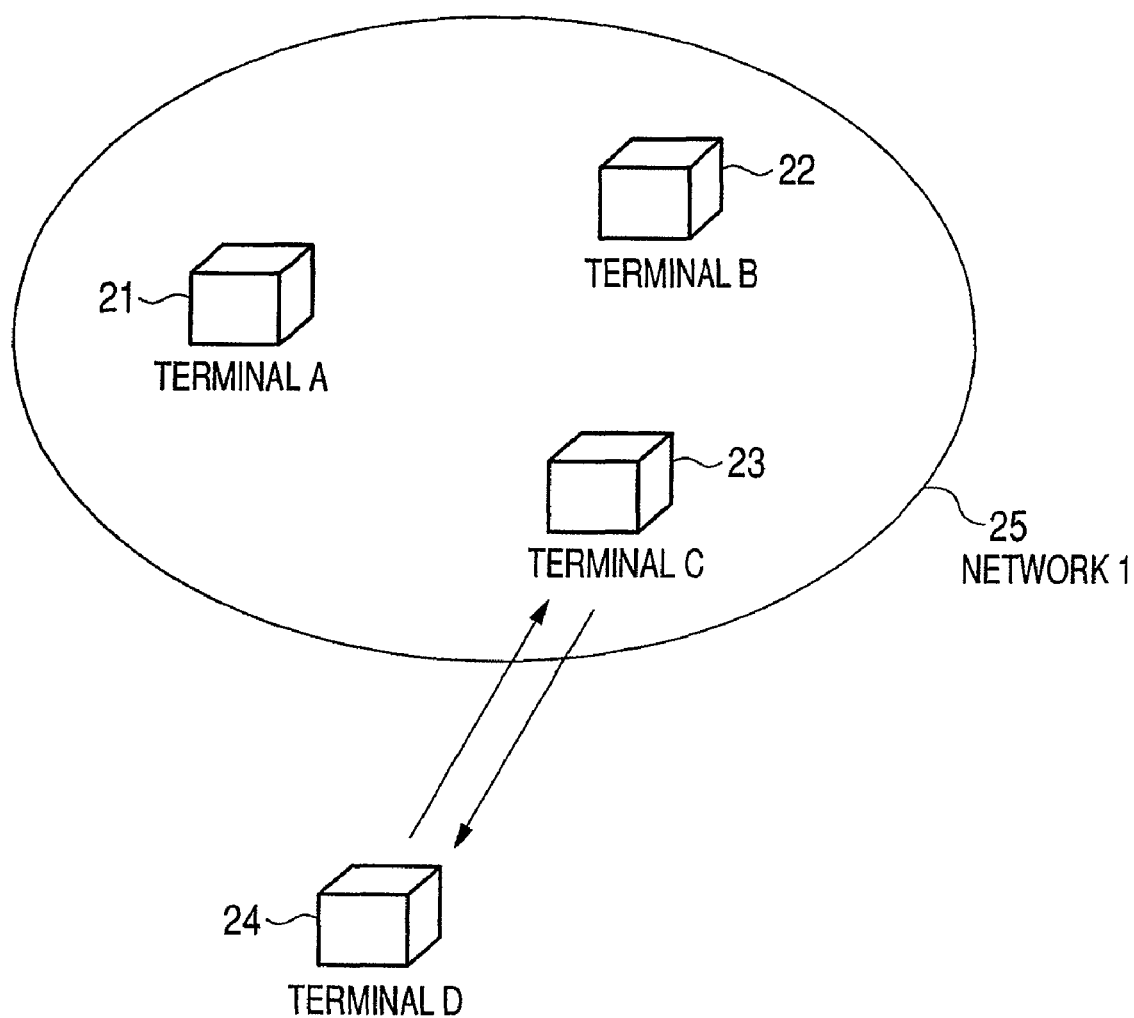
FIG. 6 is a schematic diagram in the case where the terminal C makes a response of the radio parameter automatic setting sequence as a proxy of the terminal A.

FIG. 6 is a schematic diagram in the case where the terminal C makes a response of the radio parameter automatic setting sequence as a proxy of the terminal A.

Figure 7:
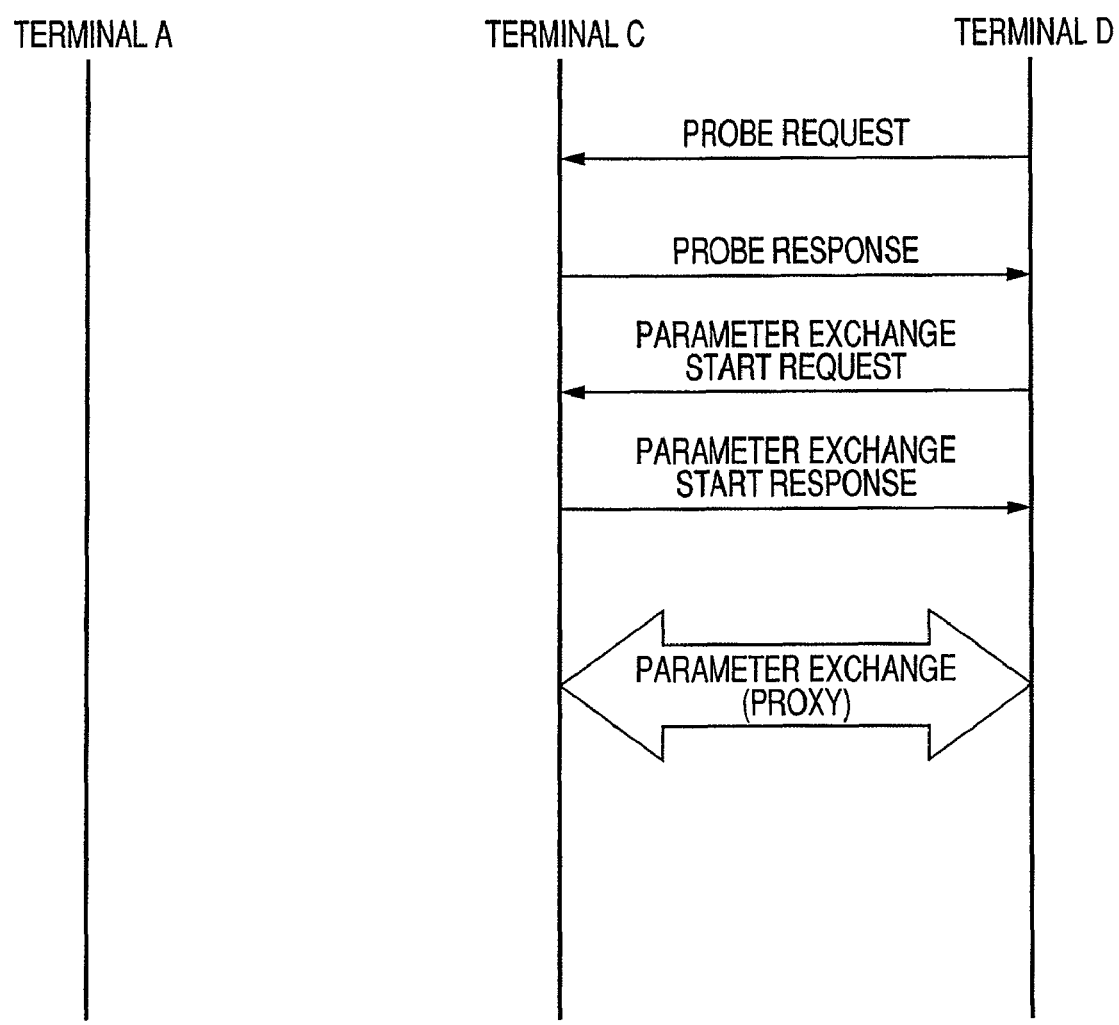
FIG. 7 is a schematic diagram of the radio parameter automatic setting sequence in the case where the terminal C makes a response of the radio parameter automatic setting sequence as a proxy of the terminal A.

FIG. 7 is a schematic diagram of a signal sequence between the terminals in FIG. 6. The operations in FIGS. 6 and 7 are executed by a method whereby the proxy response functioning unit 13b in the CPU 13 of each of the terminals C and D executes the programs stored in the ROM 12.

The terminal D transmits the probe request to the network 1 in order to participate in the network 1. It is now assumed that after the terminal C finally transmitted the beacon, the terminal D has transmitted the probe request. When the probe request is received, the terminal C returns the probe response to the terminal D. When the probe response is received, the terminal D transmits the radio parameter exchange start request to the terminal C. When the radio parameter exchange start request is received, the terminal C returns the radio parameter exchange start response to the terminal D.

When the radio parameter exchange start response is received, the terminal D makes the radio parameter automatic setting sequence operative.

The terminal C executes the operation as a radio parameter providing apparatus in place of the terminal A and executes the radio parameter automatic setting sequence between the terminals D and C.

After the terminal C made the proxy response once, the terminal C has its performance and can also exhibit the position similar to that of the terminal A after that as a radio parameter providing apparatus.

Subsequently, a method of discriminating whether the terminal C operates as a relay apparatus or operates as a proxy responding apparatus will be described.

Figure 8:
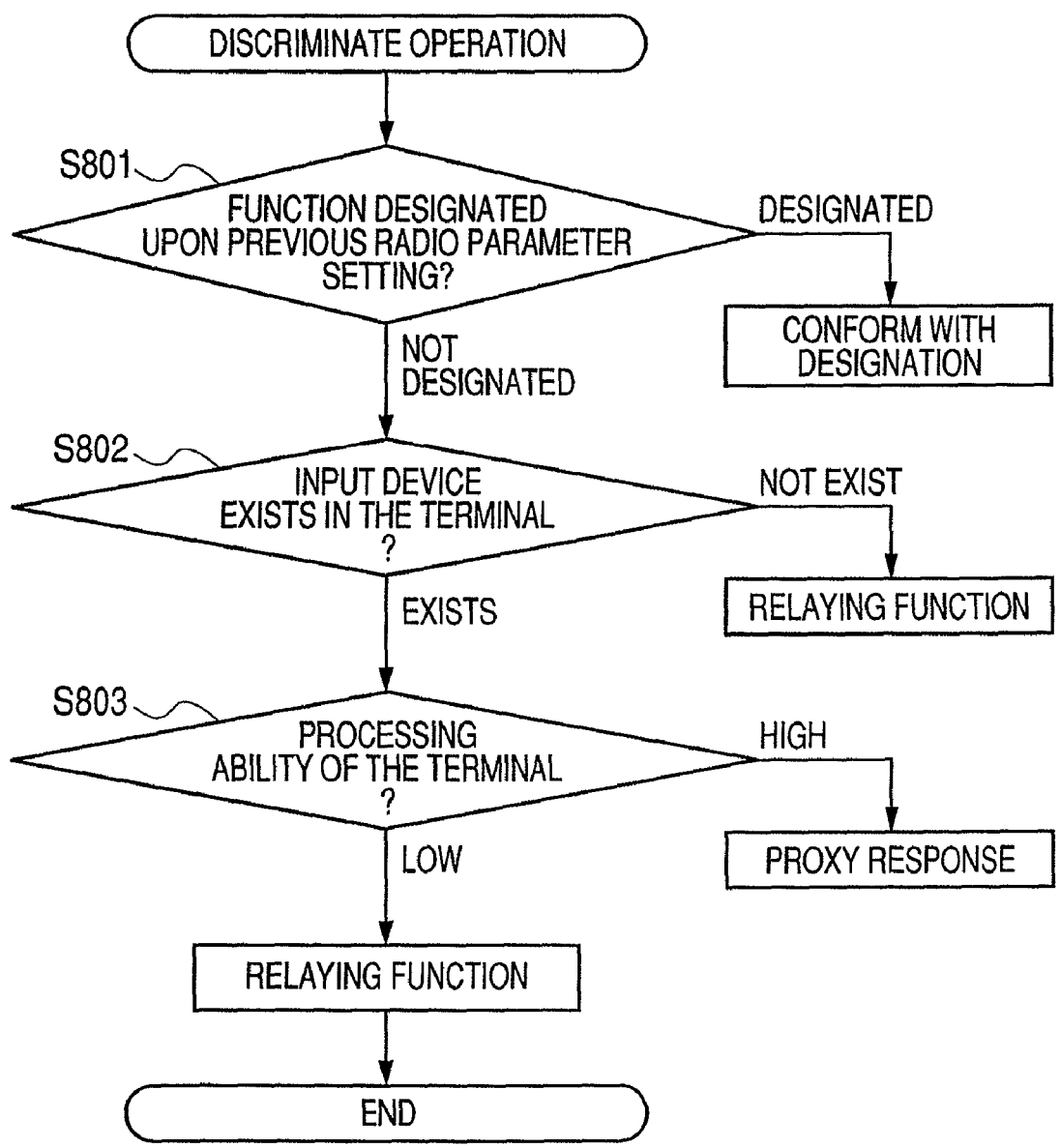
FIG. 8 is a flowchart for discriminating whether the terminal C activates a relaying function or activates a proxy responding function.

FIG. 8 is a flowchart for discriminating whether the terminal C activates a relaying function or activates a proxy responding function. The operation in FIG. 8 is executed by a method whereby the discriminating unit 13c in the CPU 13 of the terminal C executes the programs stored in the ROM 12. The processes in FIG. 8 can be executed when the radio parameters are provided to the terminal C from the radio parameter providing apparatus or may be executed when the terminal C returns the probe response to the terminal D.

The terminal C executes the radio parameter automatic setting sequence between the terminals C and A and discriminates whether or not such an instruction that the relaying function is executed, the proxy responding function is executed, or both of those functions are not executed when the radio parameters are provided has been issued from the terminal A (S801).

In the discrimination in S801, if the execution of the relaying function is instructed from the terminal A, the terminal C operates as a relay apparatus for executing the relaying function. If the execution of the proxy responding function is instructed from the terminal A, the terminal C operates as a proxy apparatus for executing the proxy responding function. If the terminal C is instructed from the terminal A so as not to execute the relaying function and the proxy responding function, the terminal C does not execute both of those functions.

If the above instruction is not issued in S801, which one of the relaying function and the proxy responding function is activated is discriminated according to the ability of the apparatus of that terminal.

First, whether or not that terminal has an input device is discriminated (S802). For example, there is a case where it is necessary to input the start instruction by an input of some authentication code or by an input of a physical switch according to the radio parameter automatic setting method which is used. To make the terminal C operative as a radio parameter providing apparatus based on such a setting method, the terminal C needs to have an inputting function for performing such an input. Therefore, if the terminal C starts the proxy responding function as a proxy of the terminal A, the terminal C needs to have an input device according to the radio parameter automatic setting method which is used. Therefore, the presence or absence of the input device is confirmed and if the terminal C does not have the necessary input device, the terminal operates as a relay apparatus for executing the relaying function.

If the terminal has the necessary input device, subsequently, processing ability of the CPU of that terminal and apparatus ability such as memory capacity, electric power consumption, or the like are discriminated (S803).

If it is determined in S803 that the apparatus ability of that terminal is high enough to execute the proxy responding function, the terminal operates as a proxy apparatus for executing the proxy responding function.

If it is determined in S803 that the apparatus ability of that terminal is not high enough to execute the proxy responding function, the terminal operates as a relay apparatus for executing the relaying function.

When the terminal operates as a relay apparatus, the terminal C may notify the terminal D that the above sequence is executed by the relaying function at the start of the radio parameter automatic setting sequence. When the terminal operates as a proxy apparatus, the terminal C may notify the terminal D that the above sequence is executed by the proxy responding function at the start of the radio parameter automatic setting sequence. By notifying as mentioned above, the terminal D can recognize that another radio parameter providing apparatus exists and that the terminal other than the terminal C exists in the network in which it participates. Thus, if the terminal D does not want to form the network together with the apparatus other than the terminal C, the radio parameter automatic setting sequence is stopped and the participation in the network can be stopped. If the terminal D does not want to receive the radio parameters from the relay apparatus or the proxy apparatus, the radio parameter automatic setting sequence can be also stopped. By the above notification, the terminal D can manage the fact that it has received the radio parameters from the relay apparatus or the proxy apparatus.

It is also possible to construct in such a manner that the discrimination in S803 in FIG. 8 is not made but so long as the terminal C has the input device, it operates as a proxy apparatus.

As mentioned above, the communication parameter automatic setting can be executed even under the environment where it is difficult to decide the providing apparatus of communication parameters. When the communication terminal newly participates in the network in which the setting of the communication parameters has already been completed, since there is no need to search for the inherent communication parameter providing apparatus, a time which is required for the communication parameter automatic setting of the new communication terminal can be shortened.

Although the desired embodiment of the invention has been described above, it is an example for describing the invention and does not limit the scope of the invention only to the embodiment. Many various modifications of the embodiment are possible within the scope without departing from the spirit of the invention. For example, although an example of the wireless LAN which conforms with the IEEE802.11 has been described above, the invention may be embodied in another wireless medium such as wireless USB, MBOA (Multi Band OFDM Alliance), Bluetooth (registered trademark), or the like.

Although the radio parameters such as network identifier, cryptographic algorithms, encryption key, authentication algorithms, and authentication key have been used as an example, other information may be included in the radio parameters.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-286470, filed Oct. 20, 2006, which is hereby incorporated by reference herein in its entirety.

The invention claimed is:

1. A communicating apparatus comprising:
a relay unit configured to operate as a relay apparatus of signals for a wireless communication parameter sharing protocol between a providing apparatus which provides wireless communication parameters and a receiving apparatus which receives the wireless communication parameters from the providing apparatus, wherein the wireless communication parameter sharing protocol serves to share wireless communication parameters to be set for a wireless communication between the providing apparatus and the receiving apparatus;
a proxy unit configured to operate as a proxy apparatus which executes the wireless communication parameter sharing protocol as a proxy of the providing apparatus; and
a selecting unit configured to select the operation as a relay apparatus by the relay unit or the operation as a proxy apparatus by the proxy unit,
wherein the selecting unit executes the selection based on an instruction from the providing apparatus.

2. A communicating apparatus according to claim 1, wherein the selecting unit executes the selection based on ability which the communicating apparatus has.

3. A communicating apparatus according to claim 2, wherein the selecting unit executes the selection based on the ability as to whether the communicating apparatus has an input device.

4. A communicating apparatus according comprising:
a relay unit configured to operate as a relay apparatus of signals for a wireless communication parameter sharing protocol between a providing apparatus which provides wireless communication parameters and a receiving apparatus which receives the wireless communication parameters from the providing apparatus, wherein the wireless communication parameter sharing protocol serves to share wireless communication parameters to be set for a wireless communication between the providing apparatus and the receiving apparatus;
a proxy unit configured to operate as a proxy apparatus which executes the wireless communication parameter sharing protocol as a proxy of the providing apparatus; and
a selecting unit configured to select the operation as a relay apparatus by the relay unit or the operation as a proxy apparatus by the proxy unit,
wherein the selecting unit executes the selection based on an instruction when the communicating apparatus has received the wireless communication parameters from the providing apparatus.

5. A communicating apparatus according to claim 4, wherein the selecting unit executes the selection based on ability which the communicating apparatus has.

6. A communicating apparatus according to claim 5, wherein the selecting unit executes the selection based on the ability as to whether the communicating apparatus has an input device.

7. A communicating apparatus comprising:
a relay unit configured to operate as a relay apparatus of signals for a wireless communication parameter sharing protocol between a providing apparatus which provides wireless communication parameters and a receiving apparatus which receives the wireless communication parameters from the providing apparatus, wherein the wireless communication parameter sharing protocol serves to share wireless communication parameters to be set for a wireless communication between the providing apparatus and the receiving apparatus;
a proxy unit configured to operate as a proxy apparatus which executes the wireless communication parameter sharing protocol as a proxy of the providing apparatus; and
a selecting unit configured to select the operation as a relay apparatus by the relay unit or the operation as a proxy apparatus by the proxy unit,
wherein the selecting unit executes the selection based on ability as to whether the communicating apparatus has an input device.

8. A control method of a communicating apparatus, comprising:
a relay step of allowing the communicating apparatus to operate as a relay apparatus of signals for a wireless communication parameter sharing protocol between a providing apparatus which provides wireless communication parameters and a receiving apparatus which receives the wireless communication parameters from the providing apparatus, wherein the wireless communication parameter sharing protocol serves to share wireless communication parameters to be set for a wireless communication between the providing apparatus and the receiving apparatus;
a proxy step of allowing the communicating apparatus to operate as a proxy apparatus which executes the wireless communication parameter sharing protocol as a proxy of the providing apparatus; and
a selecting step of selecting the operation as a relay apparatus by the relay step or the operation as a proxy apparatus by the proxy step,
wherein the selecting step executes the selection based on an instruction from the providing apparatus.

9. A control method according to claim 8, wherein the selecting step executes the selection based on ability which the communicating apparatus has.

10. A control method according to claim 9, wherein the selecting step executes the selection based on the ability as to whether the communicating apparatus has an input device.

11. A control method of a communicating apparatus, comprising:
- a relay step of allowing the communicating apparatus to operate as a relay apparatus of signals for a wireless communication parameter sharing protocol between a providing apparatus which provides wireless communication parameters and a receiving apparatus which receives the wireless communication parameters from the providing apparatus, wherein the wireless communication parameter sharing protocol serves to share wireless communication parameters to be set for a wireless communication between the providing apparatus and the receiving apparatus;
- a proxy step of allowing the communicating apparatus to operate as a proxy apparatus which executes the wireless communication parameter sharing protocol as a proxy of the providing apparatus; and
- a selecting step of selecting the operation as a relay apparatus by the relay step or the operation as a proxy apparatus by the proxy step,
- wherein the selecting step executes the selection based on an instruction when the communicating apparatus has received the wireless communication parameters from the providing apparatus.

12. A control method according to claim 11, wherein the selecting step executes the selection based on ability which the communicating apparatus has.

13. A control method according to claim 12, wherein the selecting step executes the selection based on the ability as to whether the communicating apparatus has an input device.

14. A control method of a communicating apparatus, comprising:
- a relay step of allowing the communicating apparatus to operate as a relay apparatus of signals for a wireless communication parameter sharing protocol between a providing apparatus which provides wireless communication parameters and a receiving apparatus which receives the wireless communication parameters from the providing apparatus, wherein the wireless communication parameter sharing protocol serves to share wireless communication parameters to be set for a wireless communication between the providing apparatus and the receiving apparatus;
- a proxy step of allowing the communicating apparatus to operate as a proxy apparatus which executes the wireless communication parameter sharing protocol as a proxy of the providing apparatus; and
- a selecting step of selecting the operation as a relay apparatus by the relay step or the operation as a proxy apparatus by the proxy step,
- wherein the selecting step executes the selection based on ability as to whether the communicating apparatus has an input device.

15. A computer-readable storage medium which stores a computer program for allowing a computer to execute a control method of a communicating apparatus, the method comprising:
- a relay step of allowing the communicating apparatus to operate as a relay apparatus of signals for a wireless communication parameter sharing protocol between a providing apparatus which provides wireless communication parameters and a receiving apparatus which receives the wireless communication parameters from the providing apparatus, wherein the wireless communication parameter sharing protocol serves to share wireless communication parameters to be set for a wireless communication between the providing apparatus and the receiving apparatus;
- a proxy step of allowing the communicating apparatus to operate as a proxy apparatus which executes the wireless communication parameter sharing protocol as a proxy of the providing apparatus; and
- a selecting step of selecting the operation as a relay apparatus by the relay step or the operation as a proxy apparatus by the proxy step,
- wherein the selecting step executes the selection based on an instruction from the providing apparatus.

16. A computer readable storage medium which stores a computer program for allowing a computer to execute a control method of a communicating apparatus, the method comprising:
- a relay step of allowing the communicating apparatus to operate as a relay apparatus of signals for a wireless communication parameter sharing protocol between a providing apparatus which provides wireless communication parameters and a receiving apparatus which receives the wireless communication parameters from the providing apparatus, wherein the wireless communication parameter sharing protocol serves to share wireless communication parameters to be set for a wireless communication between the providing apparatus and the receiving apparatus;
- a proxy step of allowing the communicating apparatus to operate as a proxy apparatus which executes the wireless communication parameter sharing protocol as a proxy of the providing apparatus; and
- a selecting step of selecting the operation as a relay apparatus by the relay step or the operation as a proxy apparatus by the proxy step,
- wherein the selecting step executes the selection based on an instruction when the communicating apparatus has received the wireless communication parameters from the providing apparatus.

17. A computer readable storage medium which stores a computer program for allowing a computer to execute a control method of a communicating apparatus, the method comprising:
- a relay step of allowing the communicating apparatus to operate as a relay apparatus of signals for a wireless communication parameter sharing protocol between a providing apparatus which provides wireless communication parameters and a receiving apparatus which receives the wireless communication parameters from the providing apparatus, wherein the wireless communication parameter sharing protocol serves to share wireless communication parameters to be set for a wireless communication between the providing apparatus and the receiving apparatus;
- a proxy step of allowing the communicating apparatus to operate as a proxy apparatus which executes the wireless communication parameter sharing protocol as a proxy of the providing apparatus; and
- a selecting step of selecting the operation as a relay apparatus by the relay step or the operation as a proxy apparatus by the proxy step,
- wherein the selecting step executes the selection based on ability as to whether the communicating apparatus has an input device.

* * * * *